United States Patent Office 2,872,410
Patented Feb. 3, 1959

2,872,410

IMPROVED SILICA-ALUMINA CATALYSTS AND THEIR USE IN HYDROCARBON CRACKING PROCESSES

Henry Erickson, Park Forest, Ill., assignor to Sinclair Refining Company, New York, N. Y., a corporation of Maine No Drawing. Application August 3, 1954
Serial No. 447,641

6 Claims. (Cl. 208—120)

This invention relates to improved silica-alumina catalysts and to their method of use in hydrocarbon cracking processes. More specifically, my invention is concerned with high alumina-containing silica-alumina catalysts which exhibit particular utility in hydrocarbon cracking processes.

Commercially, most petroleum refining operations include catalytic cracking methods utilizing silica-alumina catalysts. These processes generally employ catalysts of relatively low alumina content, for instance 10 to 15% by weight. There have been attempts to commercialize cracking processes employing catalysts of higher alumina content, says up to about 25% alumina; however, as yet success in this direction has not been apparent. The literature speaks of silica-alumina cracking catalysts of alumina content as high as 50% but the advantages afforded by such catalysts apparently have not been sufficient to justify the cost of the additional alumina. Refiners have considered that functionally the high alumina catalysts should exhibit increased activity in direct proportion to their aluminum content at least until the aluminum to silicon ratio rises to about 1.0. Thus it has been expected that the increased alumina would afford increased activity and selectivity in cracking the petroleum hydrocarbons to the most desirable product, gasoline. Although activity has in general been increased by increasing the alumina content of the catalysts, other factors such as increased coke laydown on the catalysts and high manufacturing costs have mitigated against their adoption in commercial processing.

In spite of the great amount of research which has been directed to silica-alumina catalysts, no one has apparently proposed a catalyst containing more than about 15% alumina which affords sufficient advantages to justify its increased cost. Catalysts of say about 20% alumina although affording some functional improvements have provided economically prohibitive. Catalysts containing close to 40% alumina have shown improvements; however, they have not been adopted commercially, for instance see U. S. Patents 2,469,314 and 2,565,886. Thus, in spite of the efforts of many who feel that higher alumina-containing catalysts should in some way give rise to improved processing to justify the increased expense, all efforts have resulted only in varying degrees of failure.

I have now developed high alumina silica-alumina catalysts which overcome their burden of cost by affording sufficiently advantageous cracking characteristics at feasible alumina levels. Although my catalyst compositions can be classed as high alumina catalysts, they do not approach alumina levels as high as heretofore proposed, e. g. 50%. I have found that not only is the amount of alumina in the catalysts critical but also their method of preparation is of the utmost significance. The silica-alumina catalysts of this invention contain a restricted intermediate range of alumina, that is from 27 to 35% by weight of alumina based upon the total weight of the finished or calcined catalysts, and, in addition, before the desired advantages are realized the catalysts must be prepared by a "co-gelation" method. Thus the critical factors of my catalysts are their restricted range of alumina and their method of manufacture.

I have noted that acidity of a silica-alumina catalyst in an important factor and that the selectivity of the catalysts is greatest at the maximum acidity as indicated by infra-red absorption spectra. Heretofore, in catalysts containing an aluminum to silicon molar ratio up to about 1.0 it has been considered that acidity varies directly as the alumina content. Contrary to these teachings it has now been found that when silica-alumina cracking catalysts are prepared by the co-gelation method the most favorable utility and apparently maximum acidity are afforded when the alumina content is from 27 to 35% by weight and particularly about 30 to 31%. This finding as far as I am aware is contrary to the teachings previously advanced. I have also found that at this maximum acidity and critical alumina content the selectivity of the catalyst under equilibrium cracking conditions to produce gasoline is at a maximum while coke laydown during the cracking reaction is minimized. Other important advantages afforded by employing my catalysts are increased resistance to attrition as well as increased resistance to sulfur and other poisons. These advantages make it possible to manufacture a high alumina content silica-alumina cracking catalyst which has sufficient commercial and functional advantages to offset economically the increased cost of the alumina.

In the present invention the catalysts must be prepared according to the co-gelation method if they are to exhibit the desired advantages. It is truly unexpected to find that if this method of preparation with 27 to 35% of alumina be used the desired properties of the catalyst are focused or brought together. So far as I am aware this is unique in this catalyst system. I have not found for instance a similar effect when using catalysts prepared by impregnation using an aluminum-containing solution followed by precipitation. Certainly in any method of preparation particular catalytic properties are improved if the alumina content is varied; however, as one property is improved another usually depreciates. The catalysts may exhibit high activity at extremely high alumina contents, e. g. 45%, but coke laydown is high and thus the utility of the catalysts does not offset their increased cost. Thus it was unexpected to find that if the co-gelation method be employed and the alumina content held within my selected operative range, this combination affords catalysts exhibiting improved properties in a combination of important respects.

According to my co-gelation method the essential aluminum content, i. e. that necessary to provide 27 to 35% by weight of alumina in the finished catalyst, is combined with the silica component before the latter is gelled and during the addition the resulting mixture must remain at a pH not greater than about 3. In forming the silica sol, silicate solution is added to sulfuric acid to insure the maintenance of a pH not greater than about 3. After the silicate has been combined and before a gel is formed the aluminum can be added. Alternatively, the aluminum can be combined with the acid before the silicate addition. The aluminum must not be combined with the silicate before contact of the latter with sufficient sulfuric acid to maintain the pH at not greater than about 3, because in the pH range of 5 to 11 resulting from the combination of the aluminum ion, e. g. as $Al_2(SO_4)_3$, and silicate, a zeolite aluminum sodium silicate is formed and an undesirable heterogeneous mass is obtained. Accordingly, the essential aluminum combination with the silica is made before the silica is gelled and while maintaining the pH of the silica at not greater than about 3 by the presence of sulfuric acid to get a homogeneous sol without the formation of flocs. In this procedure both the silica and the alumina are gelled from a mixture containing the essential silica and aluminum content of the catalysts. This co-gelation is essential in obtaining the desired catalysts.

One method of effecting the gelation is to add a refrigerated aqueous sodium silicate solution to a refrigerated dilute aqueous sulfuric acid solution containing the aluminum ion. The aluminum is usually added as aluminum sulfate, solid or aqueous. Preferably, the aluminum sulfate in aqueous solution is added after the silica sol has been formed from refrigerated sulfuric acid and silicate solutions to avoid refrigeration of the aluminum sulfate solution. It is not necessary to refrigerate any of the solutions but the formation of the silica sol at the lower temperatures is advantageous.

In any of the methods the silica hydrosol is allowed to form a hydrogel and is then formed into shaped particles. Hydrated alumina is then precipitated by treatment with ammonium hydroxide. The gelling time is dependent upon concentration of the sol, temperature and pH which are established control variables. The catalyst hydrogel is washed, dried and calcined according to conventional procedures, see U. S. Patent 2,565,886. The preferred washing procedure is a simple water wash which is continued until the catalysts are substantially free of sodium and sulfate ions. Drying can be accomplished by air contact in an oven at about 230° F. or other methods such as spray drying can be employed. The calcination step is conducted at elevated temperatures, e. g. about 1000° F., to lower the water content to the order of about 2 to 3% by weight.

In the catalyst preparations, instead of aluminum sulfate, I can use other aluminum salts, preferably having divalent anions. In each instance the alumina is precipitated by treatment with a base, preferably ammonium hydroxide. The catalyst is then washed, dried and calcined as noted above.

To illustrate more specifically the preparation of my catalysts, I took 2150 ml. of "E" brand sodium silicate solution (Philadelphia Quartz Company) and mixed them in a suitable vessel with 2150 ml. of water. The "E" brand sodium silicate solution had a specific gravity of 1.39 and contained 28.7 weight percent of silica. This mixture was added rapidly with stirring to 1763 ml. of sulfuric acid of 1.234 specific gravity to form a clear hydrosol. Both of these solutions were at approximately 35° F. 4.5 liters of a room temperature solution containing 2340 grams of $Al_2(SO_4)_3 \cdot 18H_2O$ were mixed with the resulting sol. The clear hydrosol was allowed to sit without agitation until it gelled. The gel was then cut into about ¾" cubes and immersed in dilute ammonium hydroxide solution (1 part $NH_4OH$ and 1 part $H_2O$ by volume) to precipitate hydrated alumina at a final pH of 7.5 to 8.0. The resulting silica-alumina hydrogel was washed to 0.01% sulfate and .06% sodium by percolating deionized water through the gel for 220 hours. The washed gel was dried at 230° F., ground to pass 20 mesh and calcined for 2 hours at 1050° F. This catalyst was assigned No. 400E10130.

Catalysts No. 400E10153 and No. 400E10072 were prepared according to the method given for the manufacture of catalyst No. 400E10130 except that the alumina content analyzed as indicated in Table I. Thus in preparing catalyst No. 400E10072 I employed 1433 ml. of the "E" brand sodium silicate solution in 1433 ml. of water, 1175 ml. of 1.34 density sulfuric acid, and 2 liters of aqueous solution containing 1560 grams of $$Al_2(SO_4)_3 \cdot 18H_2O$$

The catalyst was washed until it contained 0.05% sodium by weight. Catalyst No. 400E10153 was prepared identically to No. 400E10072 except that the former was dried at 110° C. before washing. The test data obtained on these three catalysts were as follows:

Table I

| Catalyst No. | Analysis, Wt. Percent $Al_2O_3$ | C. C. A. U. 5 Data [1] | | | |
|---|---|---|---|---|---|
| | | Virgin | | | |
| | | Relative Activity | D+L | Gas Factor | Coke Factor |
| 400E10153 | 30.1 | 139.0 | 63.8 | 0.92 | 0.96 |
| 400E10130 | 30.7 | 140.5 | 64.0 | 0.93 | 0.89 |
| 400E10072 | 32.4 | 153.0 | 66.5 | 0.91 | 0.90 |
| | Apparent Density, gms./cu. cm. | Steamed [2] | | | |
| 400E10153 | 0.56 | 102.5 | 56.7 | 0.89 | 0.93 |
| 400E10130 | 0.80 | 116.0 | 59.5 | 0.98 | 0.74 |
| 400E10072 | 0.65 | 107.0 | 58.0 | 0.82 | 0.77 |

[1] C. C. A. U. 5 Data in all tables in this specification were obtained by cracking an East Texas virgin gas oil at 900° F. over catalyst pretreated at 1,050° F. The products were collected, and the catalyst was regenerated in air with the $CO_2$ being collected to determine coke laydown. The pretreatment comprised heating the catalyst in a muffle furnace for 2 hours at 1,050° F.

[2] 6 hrs., 1,150° F., atmospheric pressure, 100% steam.

Several catalysts have been prepared essentially employing the "co-gelation" method used in making catalyst No. 400E10130 but with alumina contents outside of my 27 to 35% range. However, in preparing catalysts No. 400D10391 and No. 400G10014, the aluminum sulfate solution was added to the sulfuric acid before the silicate solution. In making catalysts No. 400E10044 and No. 400E10103 the sulfate was added after the silicate was combined with the acid but the sulfate was added partly as crystals and partly as a solution in order to maintain the final solids concentration of the sol. The catalysts were tested and the following data collected:

Table II

| Catalyst No. | Analysis, Wt. Percent $Al_2O_3$ | C. C. A. U. 5 Data | | | |
|---|---|---|---|---|---|
| | | Virgin | | | |
| | | Relative Activity | D+L | Gas Factor | Coke Factor |
| 400D10391 | 11.9 | 149.5 | 65.5 | 0.83 | 0.82 |
| 400G10014 | 17.8 | 147.0 | 65.4 | 0.83 | 0.93 |
| 400E10086 | 20.5 | 130.0 | 62.0 | 0.87 | 0.91 |
| 400E10158 | 21.0 | 120.0 | 60.3 | 0.89 | 0.82 |
| 400E10044 | 46.7 | 115.5 | 59.5 | 1.13 | 1.04 |
| 400E10103 | 48.3 | 134.0 | 63.0 | 1.00 | 1.15 |
| | Apparent Density, gms./cu. cm. | Steamed [1] | | | |
| 400D10391 | 0.73 | 0.83 | 51.5 | 0.81 | 0.82 |
| 400G10014 | 0.78 | 77.7 | 50.5 | 0.87 | 0.69 |
| 400E10086 | 0.75 | 95.8 | 55.0 | 0.87 | 0.75 |
| 400E10158 | 0.69 | 88.2 | 53.0 | 0.88 | 0.77 |
| 400E10044 | 0.48 | 91.0 | 53.0 | 0.94 | 0.80 |
| 400E10103 | 0.71 | 103.0 | 57.0 | 0.94 | 0.92 |

[1] 6 hrs., 1150° F., atmospheric pressure. 100% steam.

To compare my co-gelled catalysts with catalysts prepared by commercially utilized impregnation procedures, I made catalysts having alumina contents both within and without my desired range while employing the impregnation technique. Briefly, these preparations included the impregnation with an aluminum sulfate solution of a freshly precipitated, unwashed silica hydrogel prepared from refrigerated solution. The alumina was precipitated by addition of ammonium hydroxide and the resulting gel washed. The catalysts were calcined similarly to the co-gelled samples described above. The impregnated catalysts were tested and the following data obtained:

Table III

| Catalyst No. | Analysis, Wt. Percent Al₂O₃ | C. C. A. U. 5 Data | | | |
|---|---|---|---|---|---|
| | | Virgin | | | |
| | | Relative Activity | D+L | Gas Factor | Coke Factor |
| 400E10238 | 20.8 | 129.5 | 62.0 | 0.81 | 0.79 |
| 400E10234 | 34.5 | 154.0 | 66.5 | 0.78 | 0.84 |
| 400E10232 | 41.0 | 97.2 | 55.3 | 0.86 | 0.91 |
| | Apparent Density, gms./cu. cm. | Steamed [1] | | | |
| 400E10238 | 0.78 | 81.6 | 51.1 | 0.84 | 0.70 |
| 400E10234 | 0.75 | 89.5 | 53.3 | 0.80 | 0.78 |
| 400E10232 | 0.66 | 70.2 | 47.7 | 0.80 | |

[1] 6 hrs., 1150° F., atmospheric pressure, 100% steam.

All catalysts tested and reported in Tables I to III were granular catalysts and variables such as drying of hydrogels, calcination conditions, and catalyst mesh size were held constant. In each preparation the final pH, after the alumina precipitation, was held between about 7.5 to 8.5 to expedite removal of sulfate ions during the washing procedures. In a few cases it was necessary to add a trace of ammonium nitrate or ammonium acetate to the final wash water to effect more complete removal of sodium.

The data of Tables I and II show the marked increase in relative activity and D+L of my co-gelled catalysts after steaming when compared with catalysts prepared by this method but having alumina contents both above and below my selected range. These differences are not apparent when comparing the catalysts in the virgin state, and are brought out only after the catalysts have been steamed to simulate equilibrium activity and actual functioning of the catalysts under commercial processing conditions. In Table II catalyst No. 400E10103 exhibited better steamed activity than the other catalysts of this table; however, the coke laydown on the former catalyst was high and of course since it contained 48.3 weight percent of alumina it is very costly.

From the data of Table III it is clearly seen that even though the impregnated catalyst contains an alumina content within my range, the steamed relative activity is only 89.5, whereas the co-gelled catalysts of Table I have corresponding relative activities above 100. Thus the data of Tables I to III show that when alumina contents of 27 to 35% are employed in my co-gelled catalysts relative activity and D+L go through a maximum or near maximum while coke laydown is at a minimum. It is truly unexpected that all of these varying characteristics could be advantageously focused in my present catalysts by employing the manufacturing procedure and alumina content of this invention.

To show that my catalysts containing 27 to 35% alumina exhibit maximum acidity, infra-red spectra have been taken of several silica-alumina catalysts having varying degrees of alumina. In the following table these catalysts are arranged in order of decreasing acidity.

Table IV

| Catalyst No.: | Alumina content, weight percent |
|---|---|
| 400E10130 | 30.7 |
| 400H10003 | 46.1 |
| 400H10004 | 41.5 |
| 400H10002 | 21.0 |

These data give the correlation of optimum catalytic properties with maximum acidity and unexpectedly show that maximum acidity occurs within my intermediate alumina range.

The catalysts of Tables I, II and III were prepared with refrigerated reactant solutions which is the preferred procedure. On a commercial scale it may not be practical to employ refrigerated reactants; also it may be desirable to employ various water washing procedures. To illustrate these variations I have prepared several catalysts with room temperature solutions by adjusting the dilution of the sulfuric acid and aluminum sulfate solutions without changing the solids content of the resulting hydrosol.

For instance, 585 ml. of "E" brand sodium silicate solution were diluted with 585 ml. of water. This solution was added to a solution of 438 ml. of dilute sulfuric acid (specific gravity 1.234) and further diluted with 248 ml. of water. Both of these solutions were at room temperature. Upon mixing these solutions a clear sol was formed at a temperature of about 105° F. Then 872 ml. of an aqueous solution containing 582 gm. of $$Al_2(SO_4)_3 \cdot 18H_2O$$

were added and the clear sol was gelled and precipitated by addition of a dilute ammonium hydroxide solution. About one-half of the resulting hydrogel was immediately dried at 110° C. and washed for 20 hours. This product was designated as No. 400G10024. The balance of the hydrogel was washed for 96 hours by percolation of deionized water and then washed 16 hours by simple water contact. This product was then dried at 110° C. and designated as No. 400G10025. Both of these catalysts were then calcined for 2 hours at 1050° F. A third catalyst No. 400G10026 was formed from reactant solutions at 35° F. according to the procedure of manufacturing catalyst No. 400E10130. The hydrogel was then dried for 25 hours at 110° C. and washed free of sulfate ion in 13 hours. This washing was considerably less than the 220 hours taken in preparing catalyst No 400E10130 which was washed before being dried. Catalyst No. 400G10026 was calcined for 2 hours at 1050° F.

Using the same washing technique catalyst No. 400G10025 prepared at room temperature solutions did not exhibit characteristics as desirable as those of catalyst No. 400E10130 prepared from refrigerated reactant solutions. Catalysts No. 400E10130 and No. 400G10026 which were prepared from cooled solutions were equivalents regardless of which method of purification was employed; however, purification after a preliminary drying requires about 10 to 12% of the time necessary to wash the undried hydrogel. In addition considerably less equipment is needed where the preliminary drying has been conducted due to the volume contraction during drying. Obviously a great saving in water is also effected. Catalyst No. 400G10024 prepared from room temperature reactant solutions and washed after being dried was equivalent in the virgin state to catalyst No. 400E10130 produced from refrigerated reactants and employing the slow washing technique. However, after steaming catalyst No. 400G10024 seemed to produce more coke than did catalyst No. 400E10130.

As noted previously and as illustrated by the C. C. A. U. 5 data of the tables, the catalysts of my invention are particularly useful in hydrocarbon cracking reactions. The conditions of such reactions are well-known and in general the reactions include the contacting of a petroleum hydrocarbon with the catalyst in a reaction zone under cracking conditions which may include temperatures ranging from about 700° F. to 1100° F. and pressures from atmospheric up to several hundred atmospheres. The contacting time of the oil and catalyst is sufficient to effect the desired reaction taking into consideration particular oil feed and the materials to be produced. In the usual operation the catalyst is regenerated by burning off carbonaceous deposits formed on the catalyst during the cracking reaction. This burning is effected by contact with an oxygen-containing gas at temperatures generally above 900° F. After regeneration the catalyst of course can be used to effect further cracking reactions.

The catalysts of the present invention can be improved particularly in resistance to attrition by treatment with surface active agents. The useful agents are cationic, anionic and non-ionic surface active agents whose molecules contain both a hydrophobic portion and a hydrophilic portion such as soap or detergent. A wide variety of surface active materials is known in the art. See for example the classification and description of commercially known surface active agents by John W. McCutcheon, "Chemical Industries," vol. 61,811–822, November 1947. The useful materials include, for example, alkyl aryl sulfonates and sulfonic acids, sulfonated alkyl succinates, sulfated fatty alcohols, fatty esters of polyhydroxy alcohols, condensation products of ethylene oxide and fatty acids and the like. The cationic detergents such as the quaternary ammonium compounds also appear useful although they are more expensive at the present time. The non-ionic surface active agents are preferred as they do not introduce metal or acidic ions.

Many of the useful detergents contain a metallic ingredient which is undesirable in finished cracking catalysts, e. g. sodium which tends to promote sintering and loss of area of silica gel catalysts. I have found that these materials may be improved for use according to my invention by exchange reaction with metals such as magnesium or radicals such as ammonium which are not harmful and which actually contribute to activity as in the case of magnesium. In addition to the more common soaps, I have found that ammonium soaps of higher fatty acids, e. g. ammonium laurate and the ammonium soaps of mixed fatty acids derived by oxidation of waxes, are valuable in the process of my invention. A mixture of the agents may be used if desired.

In the treatment with the surface active agent it may be added to the silica hydrogel before drying, for instance in an oven or by spray drying. Alternatively, the agent may be added to the hydrogel before calcination. Generally, the surface active agent will be applied as an aqueous solution and will be incorporated into the catalyst to the extent of about 0.1 to 1% based on the weight of the water in the hydrogel.

I claim:

1. A silica-alumina catalyst comprising essentially a silica base containing from 27 to 35 weight percent of alumina based on the total weight of the final catalyst, said catalyst having been prepared by combining in an aqueous medium the essential aluminum content of the catalyst with the sodium silicate component before a silica hydrosol is gelled and in the presence of sufficient sulfuric acid to maintain the resulting mixture at a pH of not more than about 3, said aluminum content being dissolved in the aqueous medium, gelling the resulting mixture to form a silica hydrogel, adding a base to precipitate hydrated alumina in the hydrogel, washing, drying and calcinating the hydrogel.

2. The catalyst of claim 1 in which the alumina content is about 30 to 31% by weight of the final catalyst.

3. The method of preparing a silica-alumina catalyst comprising essentially a silica base containing from 27 to 35 weight percent of alumina based on the total weight of the final catalyst which comprises combining in an aqueous medium the essential aluminum content of the catalyst with the sodium silicate component before a silica hydrosol is gelled and in the presence of sufficient sulfuric acid to maintain the resulting mixture at a pH of not more than about 3, said aluminum content being dissolved in the aqueous medium, gelling the resulting mixture to form a silica hydrogel, adding a base to precipitate hydrated alumina in the hydrogel, washing, drying and calcining the hydrogel.

4. The method of claim 3 in which the alumina content of the catalyst is about 30 to 31 weight percent.

5. A method of cracking hydrocarbons which comprises contacting the hydrocarbons under cracking conditions with a catalyst comprising essentially a silica base containing from 27 to 35 weight percent of alumina based on the total weight of the final catalyst, said catalyst having been prepared by combining in an aqueous medium the essential aluminum content of the catalyst with the sodium silicate component before a silica hydrosol is gelled and in the presence of sufficient sulfuric acid to maintain the resulting mixture at a pH of not more than about 3, said aluminum content being dissolved in the aqueous medium, gelling the resulting mixture to form a silica hydrogel, adding a base to precipitate hydrated alumina in the hydrogel, washing, drying and calcining the hydrogel.

6. The method of claim 5 in which the catalyst has an alumina content of about 30 to 31 weight percent.

References Cited in the file of this patent

UNITED STATES PATENTS

| | | |
|---|---|---|
| 2,307,878 | Connolly | Jan. 12, 1943 |
| 2,483,782 | Pierce | Oct. 4, 1949 |
| 2,500,197 | Michael et al. | Mar. 14, 1950 |
| 2,565,886 | Ryland | Aug. 28, 1951 |
| 2,595,339 | Dan Herder et al. | May 6, 1952 |
| 2,694,673 | Kimberlin | Nov. 16, 1954 |
| 2,701,793 | Ashley | Feb. 8, 1955 |

UNITED STATES PATENT OFFICE
CERTIFICATE OF CORRECTION

February 3, 1959

Patent No. 2,872,410     Henry Erickson

It is hereby certified that error appears in the printed specification of the above numbered patent requiring correction and that the said Letters Patent should read as corrected below.

Column 1, line 27, for "says" read -- say --; column 4, line 59, Table II, third column thereof, for "0.83" read -- 83.0 --; column 8, line 7, for "calcinating" read -- calcining --; line 32, for "hydrosel" read -- hydrosol --.

Signed and sealed this 21st day of July 1959.

(SEAL)
Attest:

KARL H. AXLINE

Attesting Officer

ROBERT C. WATSON
Commissioner of Patents